United States Patent [19]

Ohst et al.

[11] Patent Number: 5,283,213
[45] Date of Patent: Feb. 1, 1994

[54] MOULDING COMPOUNDS FOR THE PRODUCTION OF INORGANIC SINTERED MOULDINGS AND A PROCESS FOR THE PRODUCTION OF INORGANIC SINTERED MOULDINGS

[75] Inventors: Holger Ohst, Odenthal-Steinhaus; Rolf Dhein, Krefeld; Lothar Schönfelder, Coburg, all of Fed. Rep. of Germany

[73] Assignee: Bayer Aktiengesellschaft, Leverkusen, Fed. Rep. of Germany

[21] Appl. No.: 936,506

[22] Filed: Aug. 28, 1992

[30] Foreign Application Priority Data

Sep. 10, 1991 [DE] Fed. Rep. of Germany ....... 4129952

[51] Int. Cl.$^5$ .............................................. C04B 35/52
[52] U.S. Cl. ........................................ 501/87; 501/88; 501/96; 501/102; 501/126; 501/127; 501/134; 264/63
[58] Field of Search ..................... 524/27, 30, 28, 318; 501/87, 88, 89, 92, 95, 126, 127, 128, 104, 105, 134; 264/86, 63

[56] References Cited

U.S. PATENT DOCUMENTS

| | | | |
|---|---|---|---|
| 4,349,503 | 9/1982 | Aharoni | 264/328.16 |
| 4,671,912 | 6/1987 | Komatsu et al. | 264/63 |
| 5,086,093 | 2/1992 | Miller | 524/28 |
| 5,128,399 | 7/1992 | Mochizuki | 524/318 |

FOREIGN PATENT DOCUMENTS

| | | |
|---|---|---|
| 0329475 | 8/1989 | European Pat. Off. . |
| 0426243 | 5/1991 | European Pat. Off. . |
| 3926869 | 2/1991 | Fed. Rep. of Germany . |
| 4000278 | 7/1991 | Fed. Rep. of Germany . |
| 62-260762 | 5/1986 | Japan . |
| 62-260763 | 5/1986 | Japan . |
| WO89/08124 | 9/1989 | PCT Int'l Appl. . |

OTHER PUBLICATIONS

Derwent Database, JP 56 136 838, Oct. 26, 1981.
Derwent Database, JP 561 010 067, Jan. 17, 1986.
Technische Keramik, pp. 206–210, (1990).
Edirisinghe et al., Int. J. High Technology Ceramics, 2:1–31 (1986).
Edirisinghe et al., Int. J. High Technology Ceramics, 2:249–278 (1986).

*Primary Examiner*—Mark L. Bell
*Assistant Examiner*—A. Wright
*Attorney, Agent, or Firm*—Connolly & Hultz

[57] ABSTRACT

A moulding compound is described which contains an inorganic powder together with a binder system. The binder system contains a thermoplast having a melting temperature greater than 180° C. A process is also described for making a sintered molding from the molding compound, which process includes the steps of injection moulding, removal of the binder by heating, and sintering.

13 Claims, No Drawings

MOULDING COMPOUNDS FOR THE PRODUCTION OF INORGANIC SINTERED MOULDINGS AND A PROCESS FOR THE PRODUCTION OF INORGANIC SINTERED MOULDINGS

The present invention relates to moulding compounds for the production of inorganic sintered mouldings, which compounds are suitable for processing by injection moulding or extrusion, and to a process for the production of inorganic sintered mouldings.

It is known to produce mouldings of inorganic materials by mixing a ceramic powder or a metal powder with a thermoplastic resin, shaping the mixture to produce a green body, removing the thermoplastic resin and then sintering the resulting lean body to produce the moulding. The thermoplastic resin or binder used may be, for example, polystyrene, polypropylene, polyethylene, polyethylene co-vinyl acetate or polymethylmethacrylate, in most cases in combination with auxiliary substances such as stearic acid or dioctylphthalate to improve the sliding properties of the ceramic mass. A comprehensive overview of the state of the art is given in articles by K. J. Edirisinghe and J. R. G. Evans, Int. J. High Technology Ceramics 2, 1–31 and 249–278 (1986) and by W. Michaeli, R. Bielzer, Ingenieur-Werkstoffe 2, 48–52 (1990) or G. Süssmuth, R. Gadow in: Technische Keramik (Publishers J. Kriegesmann), Vulkanverlag, Essen 1990, pages 207 et seq.

These binders are removed from the green body by heating to temperatures of 300°–550° C. The binder is thermally decomposed by this treatment. Heating to these temperatures must be carried out very carefully and slowly so that the green body will not be damaged and cracked by uncontrolled decomposition of the organic substance. The heating rate should therefore only be 4 K/hour. U.S. Pat. No. 4,671,912 recommends even slower heating rates of 1 to 2 K/hour, at least until half the binder has been removed. These long heating up periods extending over several days greatly reduce the economic efficiency of this process.

According to DE 3 926 869 A1 or DE 40 00 278 A1, one method of speeding up the removal of binder consists of decomposing down polyoxymethylene in a gas stream under conditions of acid catalysis. The disadvantage of this method lies in the corrosive acid atmosphere at temperatures of up to 150° C., which requires special apparatus, as well as the occurrence of large quantities of formaldehyde as decomposition product.

Another method consists of incorporating substances capable of sublimation with the binder. During the subsequent heating up process, these substances are the first to evaporate and act as so-called pore formers. Thus JP-A 62 260 762 describes a mixture of polypropylene, poly(ethylene-co-vinyl acetate), paraffin and anthracene as a component capable of sublimating. A similar system of binders is described in JP-A 62 260 763, in which the component capable of sublimating is terephthalic acid dimethylester. One disadvantage of these systems, however, is that the shape produced by injection moulding is only preserved if the softening temperature of the binder is not exceeded. For polypropylene, however, this temperature is too low to enable large quantities of components capable of sublimation to be released within an acceptable length of time.

It is an object of the present invention to provide a process for the production of a high quality inorganic moulding by shaping a mixture of a sinterable inorganic powder and a thermoplastic binder by injection moulding to form a green body, removing the binder and sintering, which process should not have the disadvantages mentioned above and should enable the binder to be rapidly removed from the green body without permanent changes in the green body.

It has now been found that this problem may be solved by using binders which consist predominantly of partially crystalline thermoplasts having a melting temperature above 180° C. and other low molecular weight organic compounds.

The invention thus relates to moulding compounds for the production of inorganic sintered mouldings, which compounds are suitable for processing by injection moulding or extrusion and contain a) an inorganic powder and
b) a binder system consisting of at least 20% by weight of one or more partially crystalline thermoplasts having a melting temperature above 180° C. The melting temperature is preferably from 200° to 300° C.

Although the invention is equally suitable for the production of inorganic sintered mouldings from ceramic powders and metal powders, the description of the invention is given below with reference to ceramic moulding compounds by way of example but this should in no way limit the possibilities of using the invention for metal powders.

The present invention provides many advantages, among which the following should be particularly mentioned:

The present invention provides an improved ceramic moulding compound by using thermoplasts which are free flowing in the molten state so that the moulding compound obtained can easily be processed thermoplastically even if it contains a high proportion of ceramic or metallic powder.

The present invention of improved ceramic or metallic moulding compound is distinguished by the fact that thermoplasts in combination with other low molecular weight organic compounds as binder system form readily compatible mixtures having good properties for processing and heating.

The present invention of improved ceramic or metallic moulding compound is distinguished by the fact that the partially crystalline thermoplasts have a high melting temperature (>180° C.) so that the heating process can be carried out at higher temperatures and therefore more rapidly and efficiently than in the case of the plasticizing systems conventionally used.

Further, the use of plasticizers, lubricants and dispersing agents in quantities of up to a maximum of 80% by weight as additive to the binder system enables the composition to be finely adjusted to the individual requirements for use.

As already described above, the present invention relates to ceramic or metallic moulding compounds which are suitable for injection moulding. The ceramic or metallic powder in the moulding compound is selected with a view to the function to be performed by the sintered moulding, as is well known to the man of the art.

For obtaining a sintered ceramic moulding with excellent properties, the ceramic powder should be chosen or treated to result in very densely packed powder particles. The factors mainly responsible for good packing are the particle size distribution and the degree of agglomeration [M. J. Edirisinghe, J. R. G. Evans; Int. J. High Technology Ceramics 2, 1-31 and 249-278 (1986)].

The moulding compounds of the present invention for the production of inorganic sintered mouldings also contain a binder system. According to the invention, the quantity of the binder system is less than 50% by weight, preferably from 4 to 35% by weight, of the total mixture. The binder system has the function of preserving the structure of the shaped part before sintering.

The inorganic powder according to the invention is preferably a ceramic or metal powder present in a proportion of at least 50% by weight, preferably more than 5% by weight of the total mass.

The inorganic powders according to the invention include non-oxides such as Si, $Si_3N_4$, AlN, BN, SiC, $B_4C$, transition metal carbides, nitrides, silicides and borides oxides such as $Al_2O_3$, $ZrO_2$, $SiO_2$, $Y_2O_3$, $La_2O_3$, rare earth oxides, $Cr_2O_3$, $TiO_2$, titanates, and ferrites, and elements such as B, C, Al or Si and any mixtures of these compounds or mixed phases of these compounds or metal powders. In addition to the powders, the mixtures may contain inorganic fibres or whiskers, e.g. of $Al_2O_3$, SiC or $Si_3N_4$.

Silicon and/or silicon nitride are particularly preferred inorganic powders. Typical particle sizes of the inorganic powders are in the range of from 1 to 50 μm.

One essential component of the binder system is a partially crystalline, thermoplastically processible polymer having a melting point above 180° C. present in a quantity amounting to at least 20% by weight of the total binder system. Polyesters and polyamides are preferred binders. Polyesters are particularly preferred. For this reason, binder systems based on polyesters and polyamides will be described in more detail below.

The binders according to the present invention are preferably polyesters corresponding to the following general formula I $$+O-Al-O-\overset{\overset{O}{\|}}{C}-Ar-\overset{\overset{O}{\|}}{C}\!\!\!+_{\!\!m}$$

wherein m=10 to 1000 and Al stands for a linear or branched and/or cycloaliphatic group having 2 to 36 carbon atoms, preferably $(CH_2CH_2)n$ in which n=1, 2 or 3, most preferably n=1 or 2, and Ar may stand for an aromatic group $C_6H_4$ of $C_{10}H_8$ but most preferably

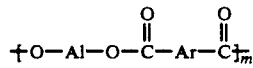

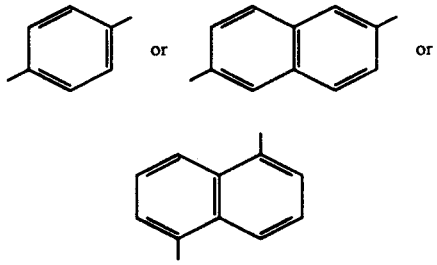

Specific examples of particularly preferred polyesters are polyethylene terephthalate (PET), polybutylene terephthalate (P8T) and polyethylene naphthenate-2,6 (PEN and poly(cyclohexanedimethylene terephthalate (PCT).

All the polyesters mentioned here, which are given only by way of example and do not constitute a complete list, are distinguished by their partial crystallinity and thermoplastic properties.

Not only are the types of polyesters known per se a familiar concept to the man of the art but he also knows that such partially crystalline thermoplastic polyesters are distinguished by high heat distortion temperatures due to their high melting temperature (above 180° C.) so that other partially crystalline polyesters not explicitly mentioned here may also be used for the purpose of this invention.

The preferred quantity of thermoplastically processible polyesters as binders in the binder system is from 30 to 80% by weight, most preferably from 40 to 70% by weight.

The use of polyesters as binders for ceramic or metallic moulding compounds has numerous advantages in the present invention. Thus polyesters undergo defined thermal decomposition reactions in which olefins and aromatic carboxylic acids are formed as decomposition products. This definite decomposition reaction leads to controllable breakdown products with uniform release of gaseous components so that polyester binders can be removed without damage to the structure of the moulded body. When decomposition is uncontrolled, as is usually the case when other binders are used, the risk of defects in the structure and weak points is substantially greater.

Further, in special variations of the heating process, such polyesters are capable of being decomposed into clearly defined alcohols and carboxylic acids by the catalytic action of acid or basic gases at elevated temperatures in the presence of steam.

Another advantage of polyesters as binders in the present invention is that water, which is generally present in a bound form in the moulding by adsorption on the large surface area of the ceramic powders used, may be dissolved in the binder surrounding the ceramic powder due to the substantially greater water absorption capacity of the polyesters compared with the polyolefins which are frequently used.

This fact prevents the occurrence of the critical point at 100° C. during the heating process, which normally occurs when conventional binders are used and which frequently gives rise to structural defects in the moulding due to the evaporating water.

The moulding compounds of the present invention contain a binder system having a partially crystalline thermoplastic polyester as essential component and one or more additives in various combinations.

These additives may comprise wetting agents (trialkoxysilanes, polyalkoxysilanes, fatty acids such as palmitic or stearic acid, polyethylene oxides, etc.), plasticizing auxiliaries (waxes such as fatty acid esters or fatty acid amides, oligomeric polyethylenes, paraffins, plasticizers such as dialkyladipate, dibutylphthalate, dioctylphthalate, butyl-benzylphthalate or N-butylphenylsulphonamide, etc.) or other auxiliary agents which have an advantageous effect on the flow properties and mould release properties (pentaerythritol tetrastearate and other fatty acid esters, silicone oils), of the mixtures during processing, and a wide range of these is known to the man of the art.

The additives may also include esters, alcohols or carboxylic acids which by virtue of their high functionality (at least three alcohol or carboxylic acid functions) are capable of bringing about cross-linking of the polyesters by transesterification with the partially crystalline polyesters so that the dimensional stability of the moulding under heat may be preserved during the heating process, even at temperatures above the melting point of the partially crystalline polyester.

The following are examples of additives suitable for cross-linking by transesterification: Esters based on glycerol, trimethylolpropane, pentaerythritol, furanose, glucose and cellulose or starch or polyvinyl alcohols such as glycerol tristearate, trimethylolpropane tristearate, pentaerythritol tristearate, pentaerythritol tetrastearate, pentaerythritol palmitate, cellulose triacetate, cellulose acetobutyrate and cellulose propionate.

Other cross-linking agents may also be used as additives, such as hexamethoxymethylene melamine or hexabutoxymelamine.

Cross-linking agents based on molecules having at least three carboxylic acid groups may also be used to bring about cross-linking of the partially crystalline thermoplasts by transesterification of these cross-linking agents in their free form or as esters, e.g. citric acid, homo- or copolymers of acrylic acid or methacrylic acid or their esters such as methyl methacrylate or butyl acrylate or copolymers with maleic acid anhydride as chemical unit.

The additives which are naturally preferred for this purpose are low molecular weight esters which have good compatibility with the polyester matrix. The following are examples:

Di-(2-ethylhexyl)-phthalate, phthalic acid dialkylesters, adipic acid dialkyl esters, fatty acid esters such as palmitic acid stearate, stearic acid myristate and montanic acid esters, glyoxalic acid diethyl ester and monomeric or oligomeric carbonates such as bis-(pentadecylphenyl) carbonate, bis-(nonylphenyl)-carbonate, oligomeric ethylene carbonate, oligomeric propylene carbonate and oligomeric hexanediol carbonate.

Phthalic acid esters are particularly suitable additives for the ceramic moulding compounds according to the invention. The low molecular weight esters or mixtures thereof advantageously amount to 10 to 60% by weight of the binder. Other additives mentioned above are generally added in quantities of up to 20 parts by weight of the binder system but preferably in quantities below 10% by weight.

Polyamides corresponding to the general formula II

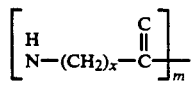

wherein
x = 2 to 11 and
m = 10–1000
are also suitable binders for the present invention. Polyamide 6 (x=5), Polyamide 11 (x=10) and PolyamideLe 12 (x=11) are particularly preferred.

Polyamides corresponding to the general formula III

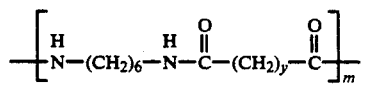

in which
y = 4–12 and
m = 10 to 1000
are also suitable binders for the present invention. Among these, Polyamide 46 (y=2), Polyamide 66 (y=4), Polyamide 610 (y=8) and Polyamide 612 (y=10) are particularly preferred.

All the polyamides mentioned here, which are given only by way of example and do not constitute a complete list, are distinguished by being partially crystalline.

Not only are the polyamide types known per se a familiar concept to the man of the art but he also knows that such partially crystalline thermoplastic polyamides are distinguished by high dimensional stability under heat due to their high melting temperature so that other partially crystalline polyamides not explicitly mentioned here may also be used for the purpose of this invention.

The preferred quantity of thermoplastically processible polyamides as binders in the binder system is from 20 to 80% by weight, most preferably from 40 to 70% by weight.

In the present invention, polyamides have several advantages as binders for ceramic moulding compounds. Thus polyamides of the general formula II in particular have the property of decomposing into their monomeric units by thermal back formation, e.g. a Polyamide 6 decomposes back into $\epsilon$-caprolactam. Such back formation into the monomer by a "zip fastener" mechanism when subjected to heat results in exactly defined and controllable breakdown products with uniform development of gaseous components so that the polyamide binder can be removed without disturbing the structure of the moulding. When decomposition is uncontrolled, as is generally the case with other binders, the risk of structural defects and weak points is substantially greater.

Polyamide-6 is thus particularly preferred as partially crystalline thermoplastic polyamide in the binder system.

Another advantage of polyamides as binders in the present invention is that water, which is generally bound in the moulding by adsorption on the large surface area of the ceramic powder used, can dissolve in the binder surrounding the ceramic powder due to the high water absorption capacity of the polyamides.

This fact prevents the critical point at 100° C. which normally occurs in the heating process when conventional binders are used and which often results in structural defects in the moulding due to the evaporating water.

The ceramic moulding compounds according to the present invention contain a binder system with polyamide as essential component and from 10 to 70% by weight of one or more low molecular weight additives. Phenols are preferred additives for this purpose.

It is well known to the man of the art that polyamides and phenols form mixtures in which they are compatible with one another (see e.g. DE-A 3 610 595 and DE-A 3 934 711). These phenols act as pore forming components during the first phase of the heating process. It is therefore preferred to use phenols which still have a sufficiently high vapour pressure for a rapid heating process at a temperature below the melting point of the polyamide. The following are examples of such phenols suitable for the invention:

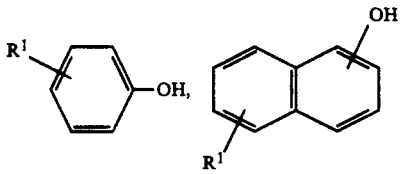

wherein R¹=H, CH₃, C₂H₅ ... C₂₀H₄₁ or aryl (C₆H₅)

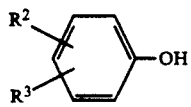

wherein R² and R³ denote C₁-C₂₀-alkyl independently of one another.

The following are examples of bisphenols:

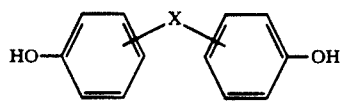

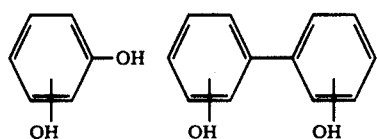

wherein x=O,CO,CH₂CH(CH₃), c(CH₃)₂.

Monofunctional phenols, in particular ortho-phenylphenol, nonyl phenol, octyl phenol, dodecylphenol and pentadecyl-phenol, are preferably added to the binder system in a quantity of from 20 to 60% by weight, and bifunctional and higher functional phenols, in particular bisphenol A, hydroquinone and p,p'-dihydroxy-diphenyl, are preferably added to the binder system in a quantity of from 5 to 25% by weight.

It may also be advantageous to use mixtures of such phenols to ensure continuous heating over a wide temperature range due to the differing vapour pressures of the phenols.

In addition to containing the main components already mentioned above (inorganic powders, polyamides, phenols), the moulding compounds of the present invention may contain other monomeric or oligomeric organic substances in various combinations in which the proportion of binder system may be up to 50% by weight.

Such additives may include wetting agents (trialkoxysilanes, fatty acids such as palmitic or stearic acid, polyethylene oxides, etc.), plasticizing agents (waxes such as fatty acid esters or fatty acid amides, oligomeric polyethylenes, paraffins, plasticizers such as dialkyladipate, dibutylphthalate, butylbenzylphthalate or N-butylphenylsulphonamide, etc.) or other auxiliary agents which have an advantageous effect on the flow properties and the mould release properties of the mixtures during processing (pentaerythritol tetrastearate and other fatty acid esters, silicone oils), and a wide range of these are known to the man of the art.

Other suitable additives include amines, isocyanates, carboxylic acids, anhydrides, alcohols and esters which by virtue of their high functionality (at least three functional groups) are capable of bringing about cross-linking of the polyamides by reaction with the partially crystalline polyamides so that the dimensional stability of the moulding can be preserved during the heating process even at temperatures above the melting point of the partially crystalline polyamide.

The invention also relates to a process for the production of the ceramic sintered mouldings. This process is characterised by the following steps:

a) Mixing of the inorganic powders with the binder system to produce ceramic or metallic moulding compounds corresponding to the present invention, b) injection moulding of these mixtures, c) heating of the injection moulded mixture and d) sintering of the mixture from which the whole binder system has been almost completely removed during heating step c).

For this purpose, a preliminary mixture may be prepared at room temperature from the ceramic powder and the components of the binder system. The subsequent preparation of the ceramic moulding compounds is carried out by the application of shearing forces in a kneader and/or extruder at temperatures from 200° to 290° C., depending on the composition of the moulding compound. The ceramic moulding compound may then be left to cool and granulated.

The usual screw type or plunger type injection moulding machines may be used for injection moulding and the moulding compounds may be injected at temperatures of from 180° to 290° C. and pressures of from 400 to 1800 bar into a mould which is maintained at 40° to 140° C. After-pressure is exerted on the moulding compound until this has solidified by cooling. This typically takes 2 to 60 seconds.

When the green bodies have been removed from the mould they are heated according to the invention for stepwise removal of the binder system, i.e. the polymeric binder and all more or less volatile additives. This heating process may be carried out in air or a mixture of steam and acid gases (e.g. HCl, HNO₃, HCOOH) or basic gases (e.g. NH₃, N(CH₃)₃, or in a protective gas atmosphere and/or at reduced pressure (1060 to 0.1 mbar). Although the heating up rate and final temperature depend on the quantity and nature of the individual components of the binder system and the characteristics (mainly geometry) of the moulded body, 5–150 K per hour may be mentioned as preferred heating up rates. It may be advantageous to include a stage of maintaining the temperature at 180° to 200° C. for a period of from 2 to 24 hours.

The final temperature of the heating process should be at least 350° C. but is preferably from 400° to 450° C.

After this stage, the temperature may be further raised to the level required for sintering the ceramic powder. The final temperature varies, of course, according to the nature of the ceramic powder used and the form of the moulded part. After the binder system has been burnt out, the temperature may generally be raised at a rate of 50 to 1000 K per hour until the desired final temperature in the region of 1000° to 2000° C. is reached.

For complete sintering of the ceramic powder, the moulding is kept at the final temperature for 15 minutes to 24 hours. Sintering is generally carried out in an atmosphere of air, oxygen, nitrogen or an inert gas.

The ceramic moulding compounds according to the invention and the process of producing ceramic mouldings from these compounds by injection moulding and thermal aftertreatment have the advantage that these compounds are easily flowing and hence easily thermoplastically processible, combined with the advantage of substantially shorter heating times of the binder system and the production of flawless ceramic mouldings.

The following Examples serve to illustrate the invention but the invention is in no way limited to the specific details mentioned.

EXAMPLES 1 to 9

90.0 g (30 Parts by weight) of various binder systems are in each case mixed with 210.0 g (70 parts by weight) of an Si powder having an average particle size of 2 μm and the mixture is worked up to a granulate in a laboratory kneader. These granulates are processed in an injection moulding machine to form rods measuring 80×10×4 mm.

The rods were heated at the rate of 10° C. per hour and maintained at 200° C. for 12 hours during this operation. The weight loss after the final temperature of 450° C. was reached amounted in all cases to more than 29% by weight, corresponding to almost complete removal of the binder system.

The quality of the heated green bodies was checked optically for cracks, blisters or other faults and the results are summarized in the following Table.

Faultless $Si_3N_4$ mouldings were obtained as finished ceramic products from the faultless test samples in a subsequent process of sintering and nitridation.

| | | Composition of the binder system[1] | | | |
|---|---|---|---|---|---|
| | | | | Additives | |
| Example[2] | Binder PBT | Dibutyl-phthalate | Dioctyladipate | Pentaerythritol tetrastearate | Polyhexanediol carbonate |
| 1* | 60 | 20 | 20 | — | — |
| 2 | 60 | 19 | 19 | 2 | — |
| 3* | 60 | — | — | 2 | 38 |
| 4* | 60 | 19 | 19 | 2 | — |
| 5 | 60 | 38 | — | 2 | — |
| 6 | 60 | — | 38 | 2 | — |
| 7 | 50 | 24 | 24 | 2 | — |
| 8 | 40 | 29 | 29 | 2 | — |
| 9 | 30 | 34 | 34 | 2 | — |

*In these examples, the initial weight of the ceramic moulding compounds was 75.9 g (25.3 parts by weight) of binder system and 224.1 g (74.7 parts by weight) of Si powder. After heating of the binder system, the weight loss was in each case more than 25%.
[1] All figures are given in parts by weight
[2] In all the Examples 1 to 9, the heated green bodies showed neither blisters nor cracks nor deformations.

EXAMPLES 10–17

78.6 g (26 Parts by weight) of various binder systems are mixed in each case with 221.4 g (74 parts by weight) of an Si powder having an average particle size of 2 μm and the mixture is worked up into a granulate in a laboratory kneader. These granulates were made up into rods measuring 80×10×4 mm in an injection moulding machine.

The rods were heated at a rate of 10° C./hour with maintenance of the temperature at 200° C. for 12 hours. The weight loss after the final temperature of 450° C. was reached amounted in all cases to more than 29% by weight, which corresponds to almost complete removal of the binder system.

The quality of the heated green bodies was checked optically for cracks, blisters and other faults and the results were summarized in the following Table.

Fault-free $Si_3N_4$ mouldings were obtained as ceramic end products from the fault-free test samples by a subsequent process of sintering and nitridation.

| | | | | | Additives | |
|---|---|---|---|---|---|---|
| | | Low molecular weight phenol | | | | Octadecyl |
| | consisting of binder | ortho-Phenyl | Bisphenol | Nonyl | Hoechst | tris-ethoxy- |
| Example[1] | Polyamide 6 | phenol | A | phenol | E-wax | silane |
| 10 | 50 | 25 | — | — | 25 | — |
| 11 | 50 | — | 25 | — | 25 | — |
| 12 | 40 | 30 | — | — | 30 | — |
| 13[2] | 30 | — | 35 | — | 35 | — |
| 14 | 50 | 5 | 20 | — | 25 | — |
| 15[2] | 50 | 10 | 40 | — | — | — |
| 16 | 49 | 25 | — | — | 25 | 1 |
| 17 | 50 | — | — | 50 | — | — |

[1] The heated green bodies were free from cracks and blisters in all the Examples with the exception of Examples 13 and 15.
[2] Blisters and deformations occurred in the green bodies of Examples 13 and 15 during heating of the green bodies.

EXAMPLE 18

The green bodies produced according to Examples 4 and 7 were heated to 200° C. at a rate of 2.5 K/min and then to 250° C. at a rate of 1.7 K/min and finally to 450° C. at a rate of 2.5 K/min. The weight loss after reaching the final temperature of 450° C. was 25% by weight for the heated green body produced according to Example 4 and more than 29% by weight for the heated green body produced according to Example 7.

The quality of the heated green bodies was checked optically and microscopically. No faults were found in the heated green bodies in either case.

EXAMPLES 19 to 23

A binder system consisting of 60 parts by weight of a polybutylene terephthalate, 19 parts by weight of dibutylphthalate, 19 parts by weight of dioctyladipate and 2 parts by weight of pentaerythritol tetrastearate was mixed with various parts by weight (depending on the specific density of the inorganic powder) of an inorganic powder, worked up into a granulate in a laboratory kneader and finally made up into green bodies measuring 80×10×4 mm in an injection moulding machine.

| | Composition of the moulding compounds: | | | |
|---|---|---|---|---|
| Example | inorganic powder | average particle size | Parts by weight of powder | Parts by weight of binder system |
| 19 | $Al_2O_3$ | about 0.5 μm | 82.0 | 18.0 |
| 20 | $Si_3N_4$ | about 0.5 μm | 79.6 | 20.4 |
| 21 | W | about 0.4 μm | 95.9 | 4.1 |
| 22 | W | about 10 μm | 95.9 | 4.1 |
| 23 | Al | about 50 μm | 76.0 | 24.0 |

The rods were heated to 450° C. at a rate of 10 K/hour and then left to cool. The weight loss in all cases corresponded to removal of more than 95% by weight of the binder system. None of the heated green bodies showed optically detectable cracks or blisters or deformations.

What is claimed is:

1. Molding compounds suitable for injection molding or extrusion for the production of inorganic sintered moldings, characterized in that they contain
    a) 50 to 95% by weight of an inorganic powder, based on the total weight of the molding compounds; and
    b) a binder system consisting of at least 20 to 80 parts by weight, based on weight of the molding compound, of one or more partially crystalline thermoplasts based on polyamides, or polyesters corresponding to the general formula

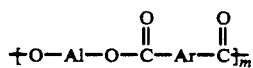

wherein m=10 to 1000 and Al stands for a linear or branched and/or a cycloaliphatic group having 2 to 36 carbon atoms and Ar may stand for an aromatic group $C_6H_4$ or $C_{10}H_8$ said thermoplasts having a melting temperature >180° C., and 10 to 70% by weight of phthalic acid esters or low molecular weight phenols.

2. Molding compounds according to claim 1, characterized in that the thermoplasts have a melting temperature of 200° to 300° C.

3. Molding compounds according to claim 1, characterized in that the binder system comprises 4 to 35% by weight of the molding compound.

4. Molding compounds according to claim 3 characterized in that the inorganic powder is a ceramic or metallic powder.

5. Molding compounds according to claim 1, characterized in that the partially crystalline thermoplastic is a polyester selected from at least one of the group consisting of poly(ethylene terephthalate) or poly(butylene terephthalate) or poly(ethylene naphthenate) or poly(cyclohexane-1,4-dimethylene terephthalate).

6. Molding compounds according to claim 1, characterized in that the partially crystalline thermoplastic is polyamide-6.

7. Molding compounds according to claim 1, characterized in that the organic powders are powders selected from one or more the group consisting of Si, $Si_3N_4$, AlN, BN, SiC, $B_4C$, transition metal carbides, nitrides, silicides and borides, $Al_2O_3$, $ZrO_2$, $SiO_2$, $Y_2O_3$, $La_2O_3$, rare earth oxides, $Cr_2O_3$, and $TiO_2$, titanates, B, C or Al.

8. Molding compounds according to claim 7, characterized in that the ceramic powder is a powder of silicon or silicon nitride.

9. Molding compounds according to claim 1, characterized in that in addition to containing said partially crystallized thermoplastic polymers, the binder system contains wetting agents, plasticizing agents, or an amine, isocyanate, carboxylic acid, alcohol or ester which contains at least three functional groups reactive with the partially crystalline thermoplasts.

10. Molding compounds as claimed in claim 1, wherein the low molecular weight phenols consist of one or more of nonylphenol, bisphenol A, or orthophenylphenol.

11. A process for the production of an inorganic sintered molding comprising:
    a) providing a molding compound as claimed in claim 1;
    b) injection molding said molding compound;
    c) removing the binder system from the resulting injectionmolded shape by heating; and
    d) sintering the shaped article.

12. A process according to claim 11, wherein the removal of binder in step c) is carried out by heating the compound to raise the temperature 4°-150° K per hour to a final temperature of 450° C.

13. A process according to claim 12, wherein the heating is interrupted for up to 24 hours in the temperature range of from 180° to 200° C.

* * * * *